United States Patent
Rollins et al.

(10) Patent No.: US 7,566,864 B2
(45) Date of Patent: Jul. 28, 2009

(54) APPARATUS AND METHODS FOR AN AREA SCANNER HAVING AN ADJUSTABLE MIRROR AND A SCAN MIRROR WITH SCAN OPERABLE TO 360 DEGREES

(75) Inventors: George E. Rollins, Chelmsford, MA (US); Suresh Ramanujan Nair, Amherst, NH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/864,005

(22) Filed: Sep. 28, 2007

(65) Prior Publication Data
US 2009/0084935 A1   Apr. 2, 2009

(51) Int. Cl.
*H01J 3/14* (2006.01)
(52) U.S. Cl. ..................... 250/234; 250/216

(58) Field of Classification Search ................. 250/234, 250/235, 236, 216, 221; 356/141.1, 141.5, 356/141.4, 139.01–139.08, 4.01–5.15; 359/224–226, 359/212–220
See application file for complete search history.

(56) References Cited

U.S. PATENT DOCUMENTS 6,204,916 B1 *   3/2001   Norita et al. ............. 356/141.1

* cited by examiner

*Primary Examiner*—Que T Le
(74) *Attorney, Agent, or Firm*—Schwegman Lundberg; William R. Walbrun

(57) ABSTRACT

Apparatus and methods for operating an area scanner having a motorless scanning mechanism provide for enhanced operation of the area scanner. In an embodiment, an area scanner includes a micro-optical-electromechanical device to direct the scan of light from an optical source over a desired area.

25 Claims, 6 Drawing Sheets

APPARATUS AND METHODS FOR AN AREA SCANNER HAVING AN ADJUSTABLE MIRROR AND A SCAN MIRROR WITH SCAN OPERABLE TO 360 DEGREES

BACKGROUND

Factory environments often include machinery that present a risk of personal injury. Safety equipment may be used to provide a reduction of risk of injury to the operator when used with potentially dangerous industrial equipment. The sensing equipment may be programmable to cause the machinery to revert to a safe condition before a person can be placed in a hazardous situation. Enhancements to safety equipment should include the reduction of complexity and/or cost to provide a safe working environment.

BRIEF DESCRIPTION OF THE DRAWINGS

Embodiments of the invention are illustrated by way of example and not limitation in the figures of the accompanying drawings in which.

DETAILED DESCRIPTION

The following detailed description refers to the accompanying drawings that show, by way of illustration, details and embodiments in which the invention may be practiced. These embodiments are described in sufficient detail to enable those skilled in the art to practice embodiments of the present invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

Figure 1:
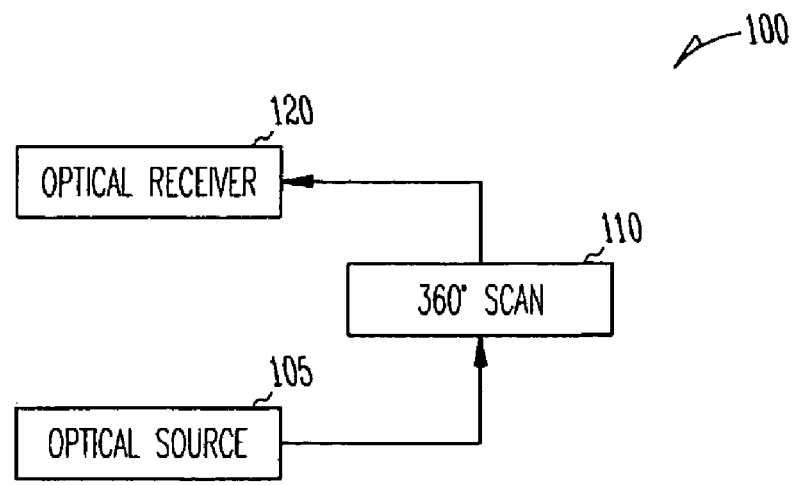
FIG. 1 illustrates a relationship between features of an embodiment of an apparatus including a mechanism to direct light from an optical source to scan 360 degrees such that the 360 degree scan is conducted without operation of a motor.

FIG. 1 illustrates a relationship between features of an embodiment of an apparatus including a mechanism to direct light from an optical source 105 to scan 360 degrees such that the 360 degree scan is conducted without operation of a motor. The result of the 360 degree scan is provided to an optical receiver 120. The mechanism for the 360 degree scan may include an arrangement of reflective surfaces whose relative orientation with respect to each other may be controlled by drive signals to one or more of the reflective surfaces in the arrangement. The 360 degree scan may be provided without using a rotating mirror. The mechanism to direct the light may be controlled to determine a depth associated with an object from which the reflected light is provided. The adjustment may be realized by moving the arrangement of reflective surfaces an appropriate distance relative to each other to evaluate the depth associated with an object. The mirror arrangement may include a micro electro-optical-mechanical (MEOM) device on which a reflective surface is mounted to provide movement of the reflective surface relative to other reflective surfaces in the arrangement. The mirror arrangement may include an actuator to which a reflective surface is mounted to provide movement of the reflective surface relative to other reflective surfaces in the arrangement. The actuator may be constructed similar to a voice coil actuator controllable by application of a magnetic field.

Optical source 105 may provide collimated light to the 360° scan. Optical source 105 may be laser. Optical source 105 may be a diode laser or other appropriate laser. Optical source 105 may be selected based on capability of integrating optical source 105 into apparatus 100. Optical source 105 may include a light emitting diode (LED), or other light source, with an appropriate set of directional optics, such as but not limited to lenses, reflectors, and attenuators, to provide a collimated beam of light to the 360° scan. The light from optical source 105 may have wavelengths in the visible spectrum. However, light from optical source 105 is not limited to wavelengths in the visible spectrum, but may include wavelengths, such as in the infra-red spectrum, according to the application in which the apparatus is disposed. Optical receiver 120 may be selected as an appropriate receiver for the light output from light source 105. Optical receiver 120 may include a photodiode or other device to convert an optical input signal to an electrical output signal.

Figure 2:
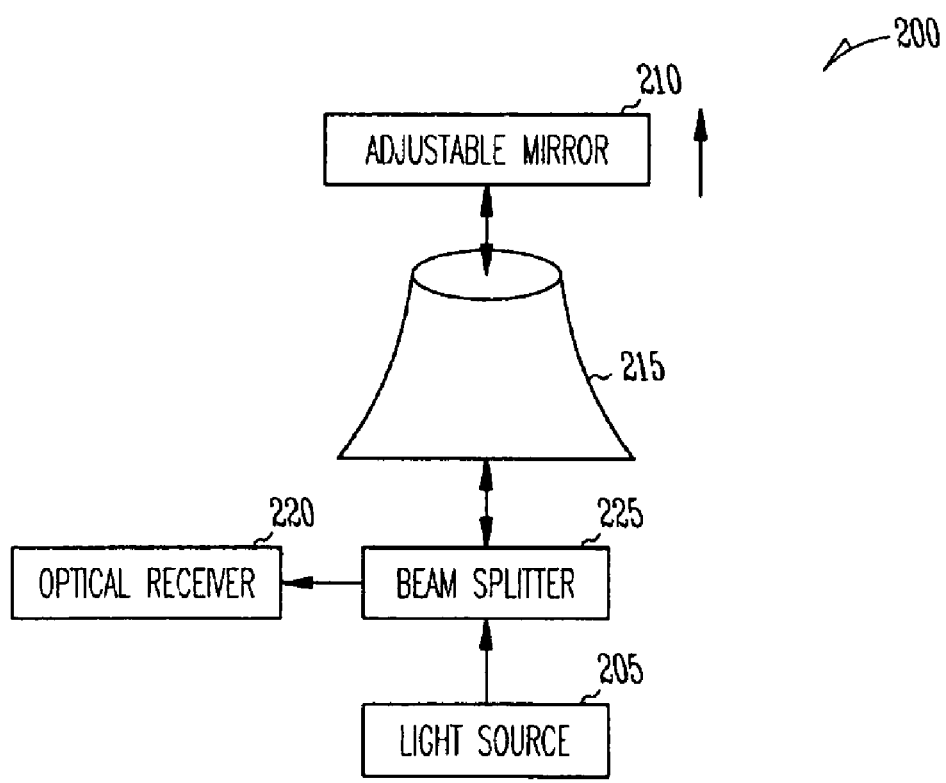
FIG. 2 depicts an embodiment of an apparatus having an adjustable mirror arranged with a mirror surface shaped to provide a 360 degree scan capability.

FIG. 2 depicts an embodiment of an apparatus 200 having an adjustable mirror 210 arranged with a scan mirror 215 having a surface shaped to provide a 360 degree scan capability. The apparatus 200 demonstrates an embodiment of an apparatus as shown in FIG. 1. The nomenclature "scan mirror" is used to indicate that the beam to scan an area is reflected from scan mirror 215 to the area being monitored. The surface of scan mirror 215 may be a surface structured to function as a reflective surface. Scan mirror 215 may have a configuration that is symmetric around an axis of the structure of scan mirror 215. Scan mirror may be arranged with respect to adjustable mirror 210 and a light source 205 such that the axis of scan mirror 215 is on the transmission axis of light through the scan mirror 215. Scan mirror 215 may have various forms including, but not limited to a conical-like shape. The reflecting surface may have a smooth finish to provide a smooth cone-line shape. The surface of the conical-like structure may have a curved shape. The amount of curvature can be selected based on the application of an area scanner for which scan mirror 215 may be implemented. The curvature may be small such as that associated with a linear shape. The reflecting surface could be segmented such that there is a flat mirror surface every 0.5 degrees. The segmented surface approaches a smooth surface as the distance is reduced from 0.5 degrees.

Light from light source 205 is directed through an opening in scan mirror 215 to adjustable mirror 210. With adjustable mirror 210 tilted with respect to a plane perpendicular to the direction of the light transmission from light source 205, the light is reflected from adjustable mirror 210 to the surface of scan mirror 215, which reflects the light to a scan area to be monitored. An object in the scan area will reflect the light back along the path from which it was generated. At a beam splitter 225, the light reflected from the object will be directed to optical receiver 220.

Scan mirror 215 with a cone structure has sides with curvature such that a small light circle, a large light circle, or a light circle of any diameter in between may be inscribed on the surface of scan mirror 215. The shape of the reflecting surface of scan mirror 215 may be one that has a changing slope such as an exponential shape in the direction away from the center axis of the cone-like structure. With adjustable mirror 210 at different distances from the cone-like structure 215 along the axis of the cone-like structure, a height may be scanned as light from adjustable mirror is reflected to different heights of cone-like structure 215 as the distance from adjustable mirror 210 and scan mirror 215 is continuously varied up and down. The shorter the separation distance, the smaller the height that is scanned. As adjustable mirror 210 moves farther away form cone-like structure 215, the higher from a lower bound, or base level, such as a floor, a scan may be conducted.

Adjustable mirror 210 may be realized as a dual-gimbal mirror. A dual-gimbal mirror is a mirror that tilts both in the x and the y direction. In FIG. 2, light from light source 205, which is transmitted through the structure having scan mirror 215 and has a returned path that is coaxial with the transmission path, propagates along the z direction. Adjustable mirror 210 sits in the xy plane. With adjustable mirror 210 arranged in a dual gimbal structure, adjustable mirror 210 tilts in each of the two orthogonal axis in the x and y plane. The mirror may tilt plus and minus horizontal or planar in the xy plane and has a tilt axis to tilt in the opposite, orthogonal direction. The tilt is essentially steerable. Using a drive waveform that tilts adjustable mirror 210 in one direction with a sine wave and in the orthogonal direction with 90 degrees of phase, a light beam can essentially be reflected to inscribe a circular arc on reflecting surface 215. The control circuitry to drive adjustable mirror 210 is not shown in FIG. 2 to focus on the relationship between adjustable mirror 210 and scan mirror 215.

Adjustable mirror 210, realized as a dual gimbal mirror, may be integrated on a micro electro-mechanical (MEM) device as a micro electro-optical-mechanical (MEOM) device that may receive drive signals to deflect a light beam in a circular pattern. The MEOM may also be driven to modulate the separation of adjustable mirror 210 from scan mirror 215 such that the light from light source 205 is modulated in scanning outward from the optical axis of transmission from light source 205. A dual-gimbal MEOM 210 arranged with scan mirror 215 in an area scanner allows for the elimination of a motor-driven mirror. Elimination of a motor-driven mirror in an area scanner may enhance the reliability such an area scanner.

In an embodiment, adjustable mirror 210 is realized as a dual-gimbal mirror incorporated with an actuator to control the x and y tilts and to move the dual-gimbal mirror in the z direction, which is along the transmission path of light through scan mirror 215. The actuator may be structured similar to a voice coil actuator. The actuator may be arranged like a cylindrical piece of material with a lining on it such that, as the structure is subjected to a magnetic field, motion is created in the lining, on which the mirror may be attached, which allows linear motion in one direction. This linear motion can be used to modulate the height of the mirror such that the scan beam can be incident at different arcs on scan mirror 215. The x and y tilts may be regulated using drive signals as with a MEOM configuration. Adjustable mirror 210 realized as a dual-gimbal mirror incorporated with an actuator allows for the elimination of a motor-driven mirror.

Optical source 205 may provide collimated light to adjustable mirror 210. Optical source 205 may be laser. Optical source 205 may be a diode laser or other appropriate laser. Optical source 205 may be selected with a design that allows it to be integrated into apparatus 200. Optical source 205 may include a light emitting diode (LED), or other light source, with an appropriate set of directional optics, such as but not limited to lenses, reflectors, and attenuators, to provide a collimated beam of light to adjustable mirror 210. The light from optical source 205 may have wavelengths in the visible spectrum. However, light from optical source 205 is not limited to wavelengths in the visible spectrum, but may include wavelengths, such as in the infra-red spectrum, according to the application in which the apparatus is disposed. Optical receiver 220 may be selected as an appropriate receiver for the light output from light source 205. Optical receiver 220 may include a photodiode or other device to convert an optical input signal to an electrical output signal.

Figure 3:
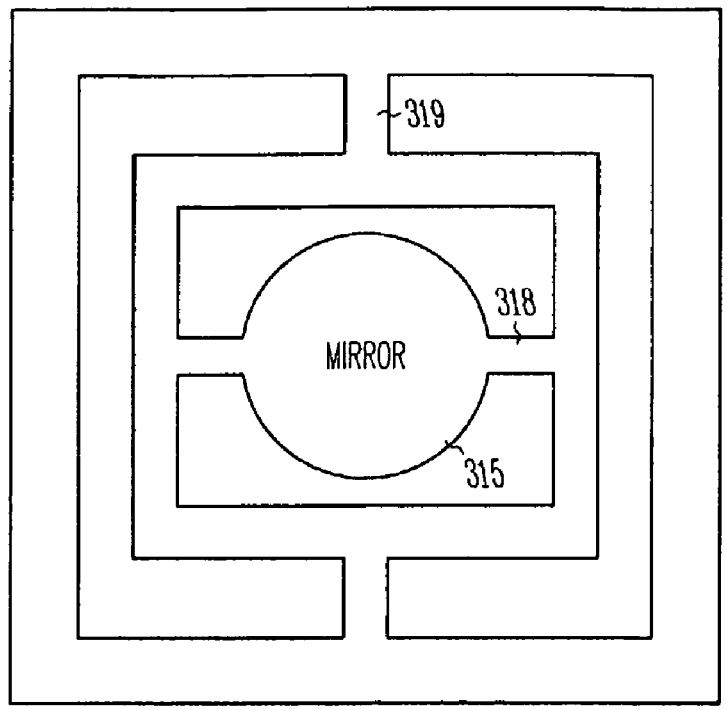
FIG. 3 shows an embodiment of a dual-gimbal mirror that may be used in the arrangements in FIGS. 1-2.

FIG. 3 shows an embodiment of a dual-gimbal mirror 315 that may be used in the arrangements in FIGS. 1-2. Dual-gimbal mirror 315 has two tilt axes 318 and 319. Dual-gimbal mirror 315 allows tilt for reflection in both the ±x and ±y directions. When dual-gimbal mirror 315 is modulated with synchronous sine and cosine deflections, it will provide a scan of a circular path. The amplitude of the tilt may be modulated to provide multiple scans.

Figure 4:
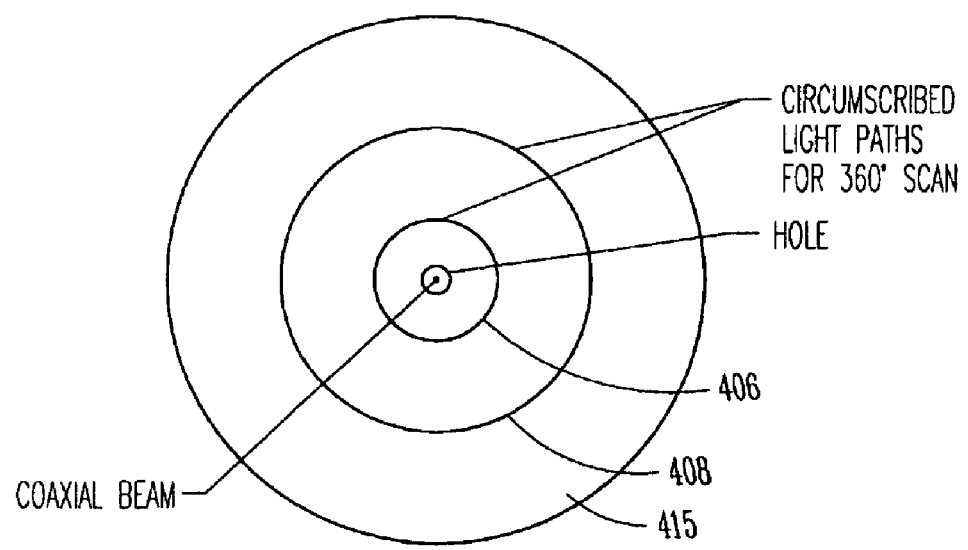
FIG. 4 shows examples of circumscribed light paths for 360 scans available with embodiments of an area scanner.

FIG. 4 shows examples of circumscribed light paths 406 and 408 for 360 degree scans available with embodiments of an area scanner. The area scanner may be arranged as in FIG. 2 with in which a structure has an opening through which light is co-axially transmitted to an adjustable mirror (not shown) that reflects the light to mirror surface 415. Differences in light paths 406 and 408 are provided by different orientations of the adjustable mirror. By adjusting the adjustable mirror with a sinusoidal signal, the light paths provide a 360 degree scan.

Figure 5:
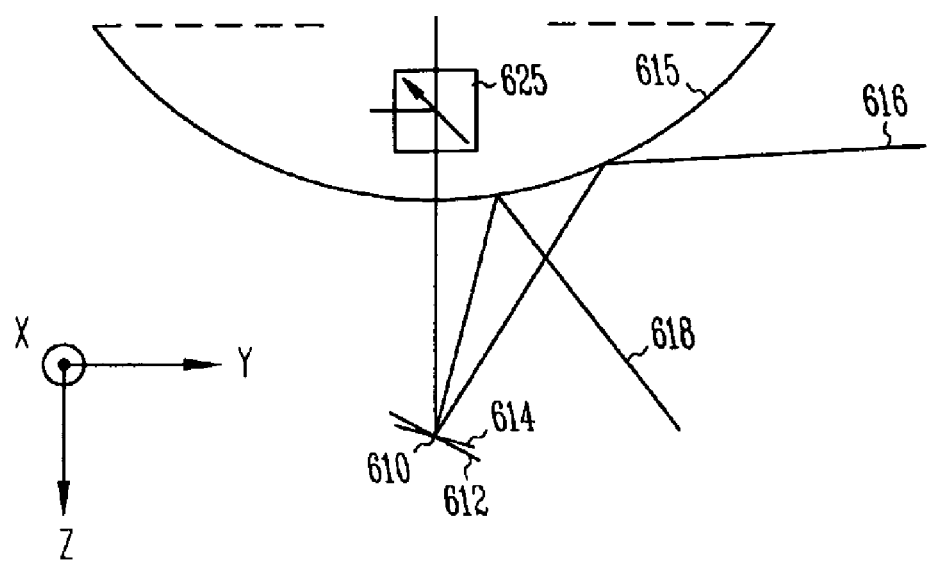
FIG. 5 shows examples of scans available with varying tilts of an embodiment of an adjustable mirror of an area scanner.

FIG. 5 shows examples of scans available with varying tilts 512 and 514 of an embodiment of an adjustable mirror 510 of an area scanner. The area scanner may be arranged as in FIG. 2 with in which a structure has an opening through which light is co-axially transmitted to adjustable mirror 510 that reflects the light to mirror surface 515. Light from adjustable mirror 510 is directed to mirror surface 515, where the light is provided by transmitting the light through beam splitter 525 to adjustable mirror 510 through an opening in the structure. Reflections from tilt 512 are reflected off mirror surface 515 in direction 516, while reflections from tilt 514 are reflected off mirror surface 515 in direction 518. With 516 and 518 correlated to extremes of a common object, light returning along these paths may be used to ascertain a relative height of the scanned objected. Return light from reflections off objects in the scan area is received from reflection by beam splitter 525.

Figure 6:
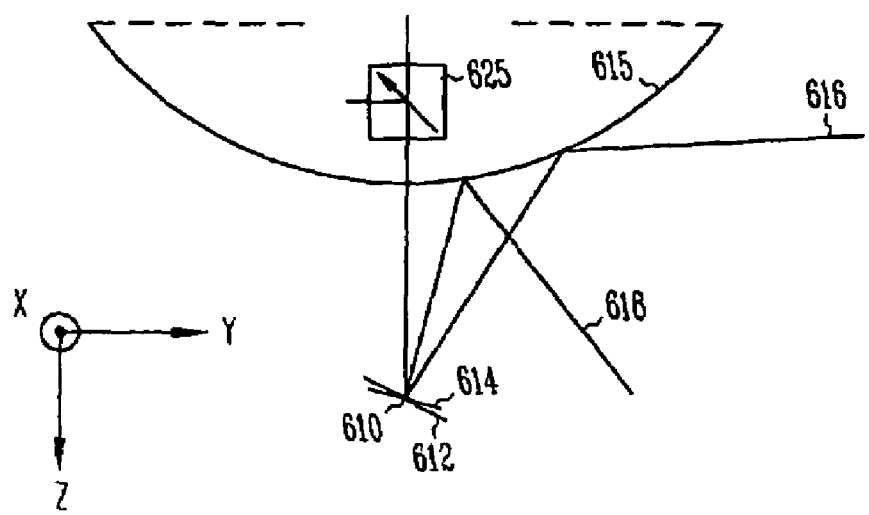
FIG. 6 shows examples of scans available with varying tilts of an embodiment of an adjustable mirror of an area scanner.

FIG. 6 shows examples of scans available with varying tilts 612 and 614 of an embodiment of an adjustable mirror 610 of an area scanner for a scan mirror having a convex reflecting surface 615. The area scanner may be arranged as in FIG. 2 with in which a structure has an opening through which light is co-axially transmitted to adjustable mirror 610 that reflects the light to mirror surface 615. A convex conical mirror having convex reflecting surface 615 increases the scanned beam deflection in the z direction relative to the scanned beam deflection provided by an exponential shape as shown in FIG. 2. Light from adjustable mirror 610 is directed to a mirror surface 615, where the light is provided to adjustable mirror 610 through an opening in the structure. Reflections from tilt 612 are reflected off mirror surface 615 in direction 616, while reflections from tilt 614 are reflected off mirror surface 615 in direction 618. Return light from reflections off objects in the scan area is received from reflection by beam splitter 625.

Figure 7:
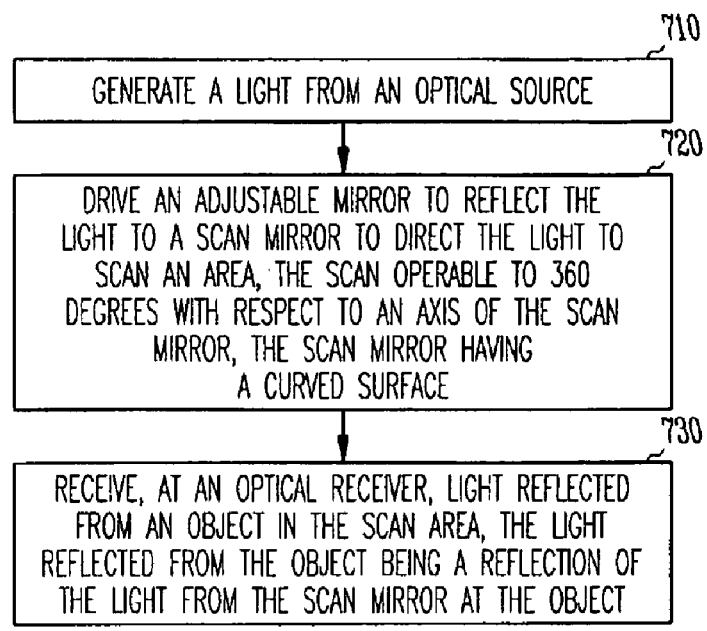
FIG. 7 shows features of an embodiment of a method for scanning an area.

FIG. 7 shows features of an embodiment of a method to optically scan an area. The method may use the features of the embodiments for an area scanner in FIGS. 1-6. At 710, light is generated from an optical source. The light may be provided as a collimated beam. The light is directed through a scan mirror having an opening to allow the beam to propagate to an adjustable mirror. The transmission of the light may be along an axis of the scan mirror. The surface of the scan mirror may be symmetric with respect to this axis. The light may be generated having a wavelength in the visible spectrum. The wavelength is not limited to the visible spectrum.

At 720, an adjustable mirror is driven to reflect the light to a scan mirror to direct the light to scan an area, where the scan is operable to 360 degrees with respect to an axis of the scan mirror. The scan mirror has a reflecting surface to direct the light to the scan area. The scan may be conducted without using a motor-driven mirror or rotating mirrors. Drive signals may be provided to change the orientation of a mirror in a dual-gimbal arrangement to regulate the scan. Multiple lines of scan can be provided by modulating the dual-gimbal mirror arrangement with sine waveforms and waveforms 900 out of phase. Depth of an object may be scanned by modulating drive waveforms to the dual-gimbal mirror. The drive signals may be regulated to scan an area using less than a 360 degree scan. The movement of the adjustable mirror may be modulated in a direction along the axis for the scan mirror to vary the diameter of the scan area relative to the axis for the scan mirror.

At 730, light reflected from an object in the scan area is received at an optical receiver, where the light reflected from the object is a reflection of the light from the scan mirror at the object. The light received at the optical receiver may be analyzed to determine characteristics of the object. With control of the timing of the scanning of the light, the return paths are known. The light from the return paths can be processed to ascertain contours and shapes of objects in the scan area that provide the returned light. The determination may be based on correlating the received light with the modulation of the movement of the adjustable mirror. The light received from the scanning procedures may be analyzed to determine an occurrence of a safety event in the scan area. The scan area may be a commercial area in which industrial activity is conducted. A safety event may include a person moving within a specified distance of machinery. The level of the safety hazard event may depend on the status of the machinery such as whether of not the machinery is operating, the level of operation of the machinery, or various combinations of factors. Analysis can include monitoring the output of an optical receiver of the area scanner over time to determine the safety status of the scan area. The determination of the safety event may be followed by shutting down a machine.

The identification of safety events may be realized using a system incorporating various embodiments of an area scanner operable to scan 360 degrees without using a motor-driven mirror. For operation of the area scanner as a safety area scanner in the system, the system may subjected to a teaching process. A teaching process allows standard objects in the scan area to be identified as components of the scan area. The teaching process may include a calibration using objects of known height to correlate with depth measurements acquired by scanning a light from an adjustable mirror of the area scanner to direct deflections at levels on a scan mirror of the area scanner, as discussed herein with respect to various embodiments. By monitoring relative changes in the height measurements determined from return signals to the area scanner, the motion of an object in a scan area may be determine and vectorial relationships among the objects in the scan area may be generated.

In various embodiments, the output from an optical receiver of an area scanner can be analyzed using software. The software may be provided as a set of machine-executable instructions on a machine-readable medium, such as a computer-readable medium, having computer-executable instructions, processed by one or more processors to analyze the output of the optical receiver of the area scanner with respect to objects in the scan area. The instructions can provide management of operating functions in response to the analysis. In an embodiment, the teaching process can provide for ignoring certain objects moving into the scan area.

The results from analyzing output from the optical receiver of an area scanner may be used to generate signals correlated to the results and transmit the signals over a communications network. Signals generated from the results and transmitted over a communication network may provide information to other systems. The information may include safety reports, safety alarms, status of the objects in the scanned area, historical data with respect to the objects in the scanned area, and other information. The communications network may be a local area network (LAN), a wide area network (WAN), a wireless network, the Internet, a public network, a private network, and/or combinations thereof.

Figure 8:
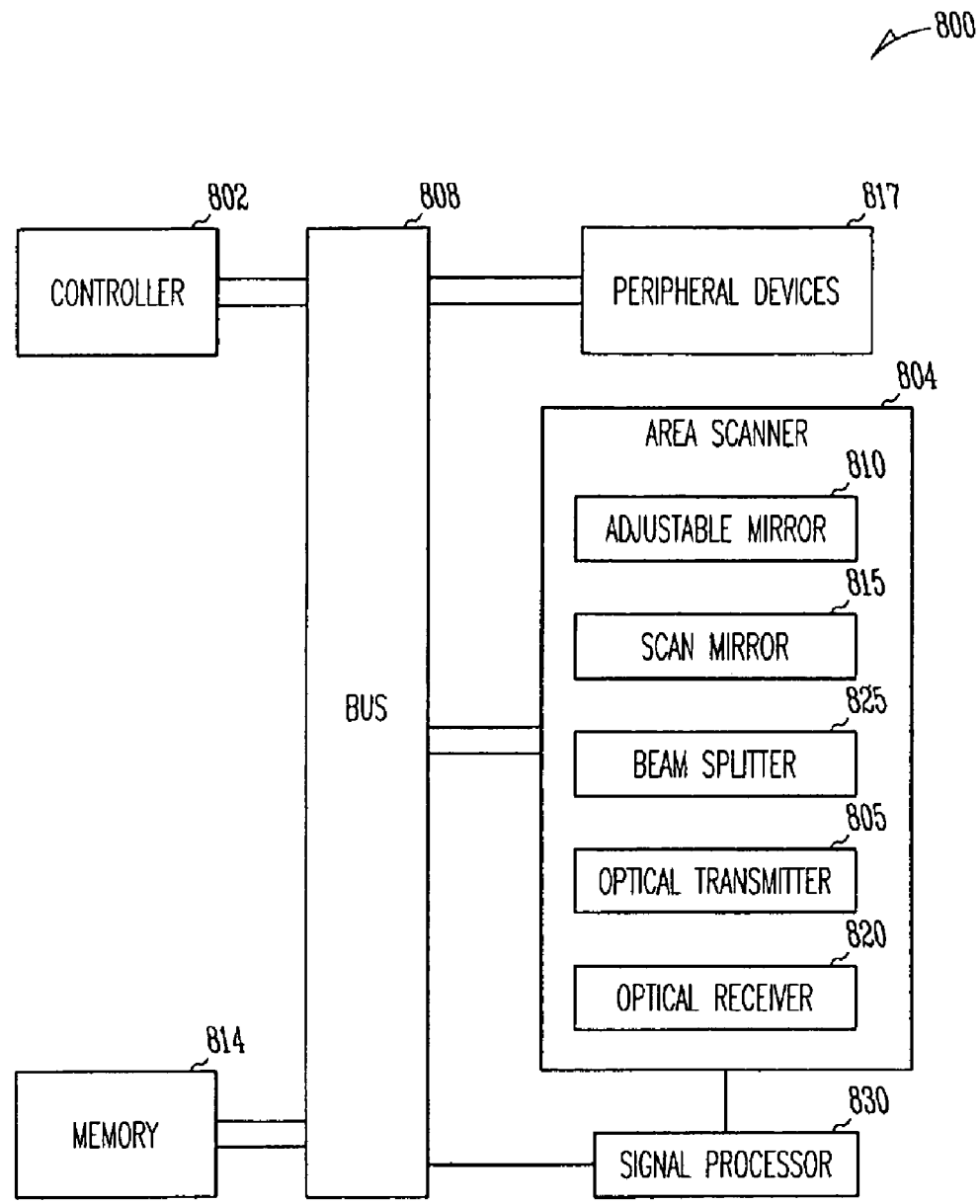
FIG. 8 shows an embodiment of a system having an area scanner.

FIG. 8 illustrates a block diagram of features of an embodiment of a system having an area scanner 804. System 800 may include a controller 802 and a bus 808, where bus 808 provides a communication path between controller 802 and area scanner 804. Area scanner 804 includes an optical transmitter 805 to provide light to an adjustable mirror 810 that redirects to a scan mirror 815 that directs the light to the scan area. Area scanner 804 may be implemented without a motor-driven mirror and arranged to operably scan 360 degrees. Area scanner 804 may be constructed without rotating mirrors. Beam splitter 825 allows light from optical transmitter 805 to be directed to adjustable mirror 810 and return light to be directed to an optical receiver 820. Area scanner 804 may be structured according to the teachings of the embodiments described herein with respect to FIGS. 1-7.

In an embodiment, controller 802 is a processor. Bus 808 may be a parallel bus. Bus 808 may be a serial bus. Bus 808 may be compatible with Peripheral Component Interconnect (PCI) or with PCI express. Bus 808 may be a collection of different transmission mediums among the various components of system 800. In an embodiment, system 800 may include a memory 814 and an additional peripheral device or devices 817 coupled to bus 808. Peripheral devices 817 may include one or more displays, alphanumeric input devices, cursor controls, memories, one or more network communications interfaces, and/or other control devices that may operate in conjunction with controller 802. Various components of system 800 may be realized with a hardware configuration, a software based configuration, or combination of hardware/software configurations.

In an embodiment, controller 802 includes control circuitry to manage the operation of area scanner 804. Controller 802 may be integral to area scanner 804. With components of area scanner 804 structured in one or more chips, controller 802 and area scanner 804 may be integrated onto a common chip set. Controller 802 may regulate the drive signals to adjustable mirror 810 to regulate the scan operable to 360 degrees and may regulate the modulation of the location of the incidence of the light deflected from adjustable mirror 810 onto scan mirror 815. Controller 802 may be responsive to operation of area scanner 804 to initiate safety actions. Alternatively, system 800 may include a signal processor 830 to control area scanner 804. Signal processor 830 may be used to analyze the output of optical receiver 820 from processing return scan light. Signal processor 830 may be directly coupled to area scanner 804 and/or coupled to area scanner 804 via bus 808. Signal processor 830 may be incorporated in area scanner 804. Signal processor 830 may operate in conjunction with controller 802 and/or memory 814.

Controller 802 in conjunction with memory 814 and peripheral devices 817 may manage area scanner 804 through signals provided on bus 808. Bus 808 may be arranged as a parallel communication path, a serial communication path, and/or individual connections, depending on the application. The management may include performing training procedures for the area scanner to respond to safety-related activities detected by area scanner 804. The management may include shutting down machinery in response to the sensing of an object in the control area of the scan. The management may include generating signals to provide visual and/or audio alarming. The management may include transmitting signals to other systems, via an interface to a network on which the other systems have communication paths, regarding a safety event and/or status of area scanner 804. The communications interface may be included with peripheral devices 817. In an embodiment, with controller 802 external to area scanner 804, area scanner 804 may include another controller to operate area scanner 804. The additional controller may operate in conjunction with external controller 802.

Memory 814 may include stored instructions to analyze received light at the optical receiver to determine characteristics of an object in the scan area. The determination may include correlating the received light with the modulation of the movement of adjustable mirror 810. Memory 814 may include stored instructions to determine an occurrence of a safety event and to response to the safety event.

Various embodiments or combination of embodiments for apparatus and methods for operating an area scanner, as described herein, can be realized in hardware implementations, software implementations, and combinations of hardware and software implementations. These implementations may include a machine-readable medium having machine-executable instructions, such as a computer-readable medium having computer-executable instructions, for performing operations to regulate the operation and response management of an area scanner. The operations may include driving the area scanner to scan 360 degrees without a motor-driven mirror. The machine-readable medium is not limited to any one type of medium. The machine-readable medium used may depend on the application using an embodiment of an area scanner having an adjustable mirror arranged with a scan mirror to provide a scan operable to 360 degrees.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description.

What is claimed is:

1. An apparatus comprising:
   an optical source;
   an optical receiver; and
   means for directing light from the optical source to scan 360 degrees and for directing reflected light resulting from the 360 degree scan to the optical receiver such that the 360 degree scan is conducted without operation of a motor.

2. The apparatus of claim 1, wherein the means for directing light is adjustable to determine a depth associated with an object from which the reflected light is provided.

3. The apparatus of claim 1, wherein optical source is configured to transmit the light as collimated light.

4. The apparatus of claim 1, wherein the light includes wavelengths in the visible spectrum and/or in the infrared spectrum.

5. An apparatus comprising:
   an optical source;
   an adjustable mirror to reflect collimated light generated from the optical source;
   a scan mirror having a reflecting surface, the reflecting surface extending 360 degrees around an axis for the scan mirror, the scan mirror aligned relative to the adjustable mirror to direct the reflected collimated light to scan an area as the orientation of the adjustable mirror is driven, the scan operable to 360 degrees; and
   an optical receiver to receive light reflected from an object in the scan area, the light reflected from the object being a reflection of the collimated light directed into the scan area by the scan mirror.

6. The apparatus of claim 5, wherein the adjustable mirror includes a dual-gimbal mirror.

7. The apparatus of claim 5, wherein the adjustable mirror includes a micro electro-optical-mechanical (MEOM) device.

8. The apparatus of claim 5, wherein the adjustable mirror includes an actuator to drive the adjustable mirror.

9. The apparatus of claim 5, wherein the reflecting surface of the scan mirror has a convex shape.

10. The apparatus of claim 5, wherein the optical source is aligned with the scan mirror such that the transmission axis of the light from the optical source is in line with the axis of the scan mirror.

11. The apparatus of claim 10, wherein the apparatus includes a beam splitter in line with the transmission axis, the beam splitter oriented to direct the light reflected from the object to the optical receiver.

12. The apparatus of claim 5, wherein the optical source is a laser.

13. The apparatus of claim 5, wherein the scan mirror has a conical-like structure with an opening to pass the collimated light from the optical source to the adjustable mirror.

14. A system comprising:
   a controller;
   a memory coupled to the controller; and
   an area scanner operatively coupled to the controller, the area scanner including:
      an optical source;
      an adjustable mirror to reflect collimated light generated from the optical source;
      a scan mirror having a reflecting surface, the reflecting surface extending 360 degrees around an axis for the scan mirror, the scan mirror aligned relative to the adjustable mirror to direct the reflected collimated light to scan an area as the orientation of the adjustable mirror is driven, the scan operable to 360 degrees; and an optical receiver to receive light reflected from an object in the scan area, the light reflected from the object being a reflection of the collimated light directed into the scan area by the scan mirror.

15. The system of claim 14, wherein the memory includes instructions stored thereon, which when implemented by the system, cause the system to perform operations including:
   driving the adjustable mirror to generate a 360 degree scan relative to the axis for the scan mirror; and
   modulating movement of the adjustable mirror in a direction along the axis for the scan mirror to vary the diameter of the scan area relative to the axis for the scan mirror.

16. The system of claim 15, wherein the memory includes instructions stored thereon, which when implemented by the system, cause the system to perform operations including analyzing received light at the optical receiver to determine characteristics of the object, the determination based on correlating the received light with the modulation of the movement of the adjustable mirror.

17. The system of claim 14, wherein the memory includes instructions stored thereon, which when implemented by the system, cause the system to perform operations including analyzing received light at the optical receiver to determine an occurrence of a safety event.

18. The system of claim 14, wherein the adjustable mirror includes a dual-gimbal mirror incorporated in a micro electro-optical-mechanical (MEOM) device.

19. The system of claim 14, wherein the scan mirror has a cone-like structure with an opening to pass the collimated light from the optical source to the adjustable mirror, the optical source being aligned with the scan mirror such that the transmission axis of the light from the optical source is in line with the axis of the scan mirror.

20. The system of claim 19, wherein the apparatus includes a beam splitter in line with the transmission axis, the beam splitter oriented to direct the light reflected from the object to the optical receiver.

21. The system of claim 14, wherein the optical source is a laser.

22. A method comprising:
   generating a light from an optical source;
   driving an adjustable mirror to reflect the light to a scan mirror to direct the light to scan a area, the scan operable to 360 degrees with respect to an axis of the scan mirror; and
   receiving, at an optical receiver, light reflected from an object in the scan area, the light reflected from the object being a reflection of the light from the scan mirror at the object.

23. The method of claim 22, wherein the method includes modulating movement of the adjustable mirror in a direction along the axis for the scan mirror to vary the diameter of the scan area relative to the axis for the scan mirror.

24. The method of claim 23, wherein the method includes analyzing the light received at the optical receiver to determine characteristics of the object, the determination based on correlating the received light with the modulation of the movement of the adjustable mirror.

25. The method of claim 22, wherein the method includes analyzing the light received at the optical receiver to determine an occurrence of a safety event.

* * * * *